Jan. 29, 1924.

S. SAKAMOTO 1,482,203

POTATO AND FRUIT PICKING BUCKET

Filed July 5, 1922

INVENTOR.
Shikataro Sakamoto
BY
ATTORNEY.

Patented Jan. 29, 1924.

1,482,203

UNITED STATES PATENT OFFICE.

SHIKATARO SAKAMOTO, OF STOCKTON, CALIFORNIA.

POTATO AND FRUIT PICKING BUCKET.

Application filed July 5, 1922. Serial No. 572,976.

*To all whom it may concern:*

Be it known that I, SHIKATARO SAKAMOTO, a subject of Japan, residing at Stockton, county of San Joaquin, State of California, have invented certain new and useful Improvements in Potato and Fruit Picking Buckets; and I do declare the following to be a full, clear, and exact description of the same, reference being had to the accompanying drawings, and to the characters of reference marked thereon, which form a part of this application.

This invention relates to improvements in accessories or devices to be used in connection with the harvesting and picking of potatoes, fruit, and other produce of a nature susceptible to easy bruising, which results in rapid deterioration of the products or spoils them for the first-class markets.

The principal object of my invention is to provide a bucket for the use of the pickers of the produce, so constructed that the contents may be discharged therefrom and into the larger receptacles without danger of bruising any of the produce, as happens when the latter is dumped from the ordinary form of picking receptacle usually used.

A further object of the invention is to produce a simple and inexpensive device and yet one which will be exceedingly effective for the purposes for which it is designed.

These objects I accomplish by means of such structure and relative arrangement of parts as will fully appear by a perusal of the following specification and claims.

In the drawings similar characters of reference indicate corresponding parts in the several views.

Figure 1:
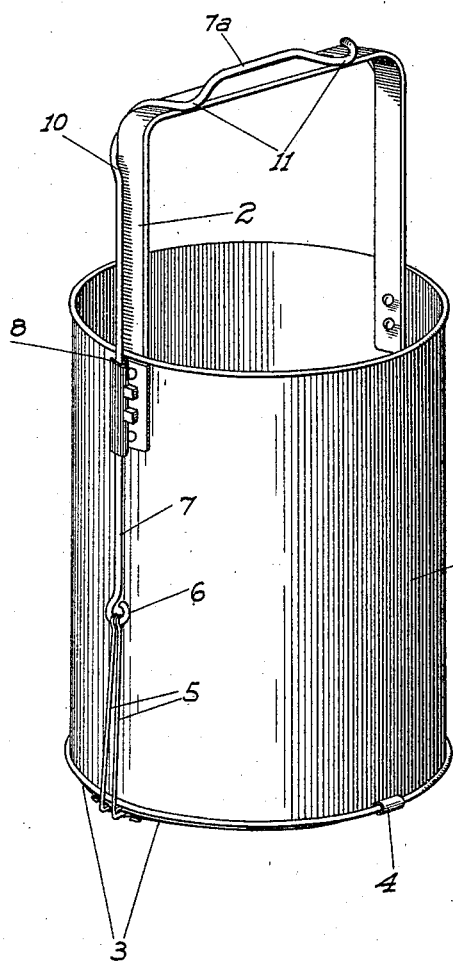
Fig. 1 is a view of the bucket, with the discharge flaps closed.
Figure 2:
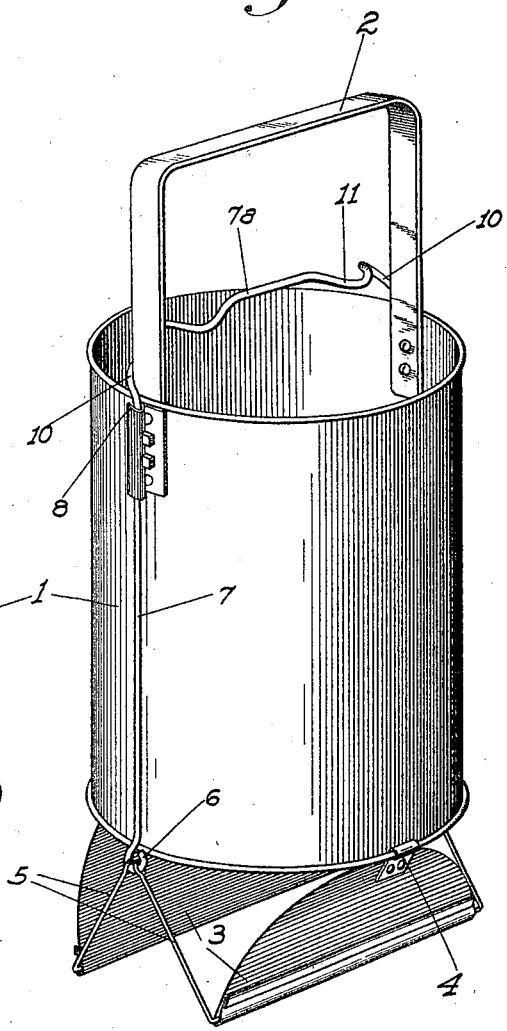
Fig. 2 is a similar view, showing said flaps opened down.

Referring now more particularly to the characters of reference on the drawings, the numeral 1 denotes the bucket, preferably cylindrical in form and of suitable dimensions, having a rigidly fixed bail or handle member 2 projecting above the same.

The bottom of the bucket is formed of a pair of members 3, split along a line diametrically disposed with regard to the bucket, and hinged thereto at opposed points, as at 4.

Flexibly connected to the opposite corners of the members 3 are links 5—of wire or light cable—which extend upwardly alongside the bucket to eyes 6 formed at the lower ends of an inverted U-shaped member 7 which projects freely through guide flanges 8 projecting outwardly from the bucket 1 at the top thereof, and in alinement with the bail 2. The vertical portions of the member 7 normally project upwardly above the bucket and alongside the handle, for a certain distance, and are then bent as at 9 to project to one side of one edge of the handle, while the horizontal member 7ᵃ of the member 7, which connects the upper ends of the bent portions 10, is formed intermediate its ends with bends 11 which are adapted to frictionally engage and rest on top of the bail 2 when the bottom members 3 are raised to their closed position, the member 7—7ᵃ being of spring material, and forming what may be termed an auxiliary bail.

By means of this construction, when the produce is being picked, the bottom members are held in a closed position by reason of the engagement of the auxiliary bail with the main bail. When it is desired to dump the contents of the bucket, the latter is lowered vertically into the receptacle which is to receive the produce, and the bottoms 3 are released by withdrawing the catch from the handle, allowing the members 7 to move freely down as the bucket is gradually raised and the contents thereof left in the other receptacle, thus avoiding any actual dropping of the produce such as would cause bruising thereof.

The bail 2, while rigidly secured, is at the same time removable, should such be desired.

Further, the vertical guide members 8, being open along one edge as shown, permit of the withdrawal of the members 7 therefrom when it is desired to dismount the parts to reduce the bulk of the bucket for shipment, etc.

From the foregoing description it will be readily seen that I have produced such a device as substantially fulfills the objects of the invention as set forth herein.

While this specification sets forth in detail the present and preferred construction of the device still in practice such deviations from such detail may be resorted to as do not form a departure from the spirit of the invention, as defined by the appended claims.

Having thus described my invention, what I claim as new and useful and desire to secure by Letters Patent, is:—

1. A bucket comprising an open topped receptacle, bottom members for the bucket hinged thereto at opposed points, said members when in alinement forming a complete closure for the bottom of the bucket, a rigidly fixed bail for the bucket projecting thereabove, an auxiliary bail slidably mounted on the outside of the bucket for vertical movement relative thereto, and connected to the bottom members, and catch means on the auxiliary bail adapted to engage the main bail when the bottom members are in their closed position.

2. A bucket comprising an open-topped receptacle, a hinged bottom structure for the bucket openable downwardly, a fixed bail for the bucket extending thereacross, an auxiliary bail for operating the bottom structure normally positioned alongside the fixed bail, and horizontal projections on the auxiliary bail then resting on the fixed bail, the auxiliary bail being flexibly mounted with respect to the fixed bail.

In testimony whereof I affix my signature.

SHIKATARO SAKAMOTO.